United States Patent
Crowell et al.

(10) Patent No.: US 9,021,483 B2
(45) Date of Patent: Apr. 28, 2015

(54) MAKING HARDWARE OBJECTS AND OPERATIONS THREAD-SAFE

(75) Inventors: Daniel M. Crowell, Rochester, MN (US); Alan Hlava, Mazeppa, MN (US); Christopher T. Phan, Rochester, MN (US); David D. Sanner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1355 days.

(21) Appl. No.: 12/430,214

(22) Filed: Apr. 27, 2009

(65) Prior Publication Data

US 2010/0275216 A1 Oct. 28, 2010

(51) Int. Cl.
*G06F 9/46* (2006.01)
*G06F 9/52* (2006.01)

(52) U.S. Cl.
CPC .................................. *G06F 9/526* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,455,958 A | * | 10/1995 | Flurry et al. | 710/65 |
| 5,734,909 A | * | 3/1998 | Bennett | 710/200 |
| 7,464,209 B2 | * | 12/2008 | Armstrong et al. | 710/200 |
| 8,082,379 B2 | * | 12/2011 | Fachan et al. | 710/200 |
| 2001/0014905 A1 | * | 8/2001 | Onodera | 709/102 |

* cited by examiner

*Primary Examiner* — Eric C Wai
(74) *Attorney, Agent, or Firm* — Dugan & Dugan, PC

(57) ABSTRACT

Performance in object-oriented systems may be improved by allowing multiple concurrent hardware control and diagnostic operations to run concurrently on the system while preventing race conditions, state/data corruption, and hangs due to deadlock conditions. Deadlock prevention rules may be employed to grant or deny request for hardware operation locks, hardware communication locks, and/or data locks.

14 Claims, 11 Drawing Sheets

| Currently Running Thread | Hardware Operation Lock | Hardware Communication Lock | Data Lock |
|---|---|---|---|
| Hardware Operation Lock | Not Allowed | Allowed | Allowed |
| Hardware Communication Lock | Not Allowed | Not Allowed | Allowed |
| Data Lock | Not Allowed | Not Allowed | Not Allowed |

| Currently Running Thread | Hardware Operation Lock | Hardware Communication Lock | Data Lock |
|---|---|---|---|
| Hardware Operation Lock | Not Allowed | Allowed | Allowed |
| Hardware Communication Lock | Not Allowed | Not Allowed | Allowed |
| Data Lock | Not Allowed | Not Allowed | Not Allowed |

FIG. 10

| Thread 1 | Thread 2 |
|---|---|
| Request Hardware Operation Lock on Chip A<br>Chip A locked<br><thread switch> | |
| | Request Data Lock<br>Data locked<br>Request Hardware Operation Lock on Chip A --\| blocked<br><thread switch> |
| Request Data Lock --\| blocked | |
| DEADLOCK | |

FIG. 12A

| Thread 1 | Thread 2 |
|---|---|
| Request Hardware Operation Lock on Chip A<br>Chip A locked<br><thread switch> | |
| | Request Hardware Communication Lock on JTAG Device<br>JTAG Device locked<br>Request Hardware Operation Lock on Chip A --\| blocked<br><thread switch> |
| Request Hardware Communication Lock on JTAG Device --\| blocked | |
| DEADLOCK | |

FIG. 12B

| Thread 1 | Thread 2 |
|---|---|
| Request Hardware Operation Lock on cage 0<br>    cage 0 locked<br>    card 0 locked<br>    chip A locked<br><thread switch> | |
| | Request Hardware Operation Lock on chip B<br>    chip B locked<br>Request Hardware Operation Lock on chip A --\| blocked<br><thread switch> |
| Request Hardware Communication Lock on JTAG Device<br>--\| blocked | |
| DEADLOCK | |

FIG. 12C

| Thread 1 | Thread 2 |
|---|---|
| Call classA::functionA1() classA Data locked <thread switch> | |
| | Call classB::functionB2() classB Data locked <thread switch> |
| classA::functionA1() calls classB::functionB2() request classB Data Lock --\| blocked <thread switch> | |
| | classB::functionB2() calls classA::functionA1() request classA Data Lock --\| blocked <thread switch> |
| DEADLOCK | |

FIG. 12D

MAKING HARDWARE OBJECTS AND OPERATIONS THREAD-SAFE

FIELD OF THE INVENTION

The present invention relates generally to hardware and data locking, and more particularly to making hardware objects and operations thread-safe with locking mechanisms and deadlock prevention rules.

BACKGROUND OF THE INVENTION

A hardware object that is suitable for use in an object-based environment generally includes a set of operations and a state that effectively remembers the effect of the operations. Since an object has at least some memory capability, an object differs from a function, which has substantially no memory capability. For example, a value returned by an operation associated with an object is dependent upon the state of the object as well as the arguments to the operation. As such, each invocation of an object may have a different result. In contrast, a value returned by a function is typically dependent only on the arguments to the function.

Within an object-based environment, threads are often used to satisfy requests for services. A thread is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is pushed on the execution stack of the thread. When the method returns, or is deactivated, the activation is popped from the execution stack. Since an activation of one method may activate another method, an execution stack operates in a first-in-last-out manner.

In object-based environments, only one thread is allowed to invoke one of some number of operations (e.g., synchronized operations) that involve a particular object at any given time. Synchronization constructs, such as locks, are used to control access to shared resources (e.g., objects) such that only a single thread may invoke operations on a shared object at any given time. By way of example, in order to prevent more than one thread from operating on an object at any particular time, objects are often provided with locks. The locks are arranged such that only the thread that has possession of the lock for an object is permitted to execute a method on that object.

Generally, such locks are either global or local. Global locks are locks shared by multiple objects. Local locks are locks allocated separately to each object. More than one object may be locked by one or more threads at any given time. That is, different threads may hold locks to different objects at substantially the same time. For example, a first thread a may obtain a first lock and, hence, lock a first object while a second thread has possession of second lock and, therefore, access to a second object. However, if the first thread wishes to obtain a lock on the second object, then the first thread must wait for the second thread to relinquish control of the second object.

Deadlock, as will be understood by those skilled in the art, is a failure in which two or more threads are stopped while waiting for each other to perform an action. For example, deadlock may occur when a first thread holds the lock on a first object, and next requires that a second object be locked before relinquishing the lock on the first object, while a second thread holds the lock on the second object, and next requires that the first object be locked before relinquishing the lock on the second object.

Traditional methods of object locking generally use global locks. Such methods introduce increased waiting for held locks, which can defeat the purpose of concurrent operations and greatly affect system performance. One alternative to the conventional deadlock prevention rules is to monitor for deadlock conditions externally. This method makes recovery much more difficult and does not provide as much test coverage because the focus is shifted from early deadlock prevention to deadlock detection. Other conventional methods serialize operations to avoid resource conflict; these methods similarly suffer in performance.

Therefore, alternatives are desirable to minimize lock related overhead.

SUMMARY OF THE INVENTION

At least one embodiment of the present invention may provide a method of deadlock prevention in object-oriented systems. Performance in object-oriented systems may be improved by allowing multiple concurrent hardware control and diagnostic operations to run concurrently on the system while preventing race conditions, state/data corruption, and hangs due to deadlock conditions. Deadlock prevention rules may be employed to grant or deny requests for hardware operation locks, hardware communication locks, and/or data locks.

A method of deadlock prevention may include receiving a first lock request and determining if a prior lock is in use. A determination may be made as to whether the first lock request may be granted based at least in part on the determination if a prior lock is in use. The first lock request may be granted based on the determination of if the first lock request may be granted and a lock based on the first lock request may be employed. Alternatively, the first lock request may be denied based on the determination of if the first lock request may be granted.

Other features and aspects of the present invention will become more fully apparent from the following detailed description, the appended claims, and the accompanying drawings.

BRIEF DESCRIPTION OF THE FIGURES

FIG. 10 is a table for use in deadlock prevention according to an embodiment of the present invention;

FIGS. 12A-D are tables showing various deadlock scenarios that may be avoided according to an embodiment of the present invention.

DETAILED DESCRIPTION

An embodiment of the present invention relates to improving performance in object-oriented systems by allowing multiple concurrent hardware control and diagnostic operations to run concurrently on the system while preventing race conditions, state/data corruption, and hangs due to deadlock conditions.

Figure 1:
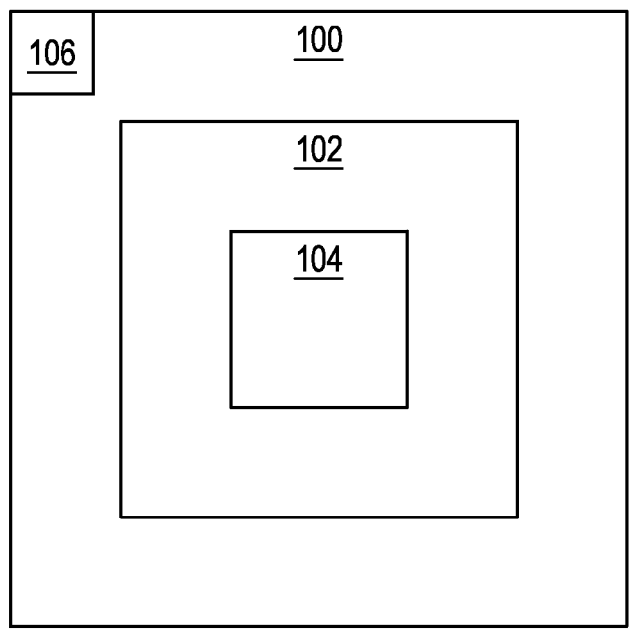
FIG. 1 is a schematic representation of a server system according to an embodiment of the present invention.

FIG. 1 is a schematic representation of a server system 100 according to an embodiment of the present invention. Server system 100 may include a central electronic complex (CEC) 102, which may include a flexible service processor (FSP) 104. In an embodiment, server system 100 also may include a server system processor 106.

CEC 102 may be any appropriate hardware system that may include a processor and/or memory, such as the computer 200 described below with respect to FIG. 2 and/or CEC 400 described below with respect to FIG. 4. CEC 102 may be modeled by firmware component code, such as hardware object model (HOM) 300, discussed below with respect to FIG. 3.

FSP 104 may be firmware that may provide diagnostics, initialization, configuration, run-time error detection and correction in server system 100. In operation, FSP 104 may initialize CEC 102 hardware and may initiate a boot of server system processor 106.

Server system processor 106 may be any appropriate processor as is known and/or associated components, such as those discussed below with respect to computer 200 in FIG. 2.

Figure 2:
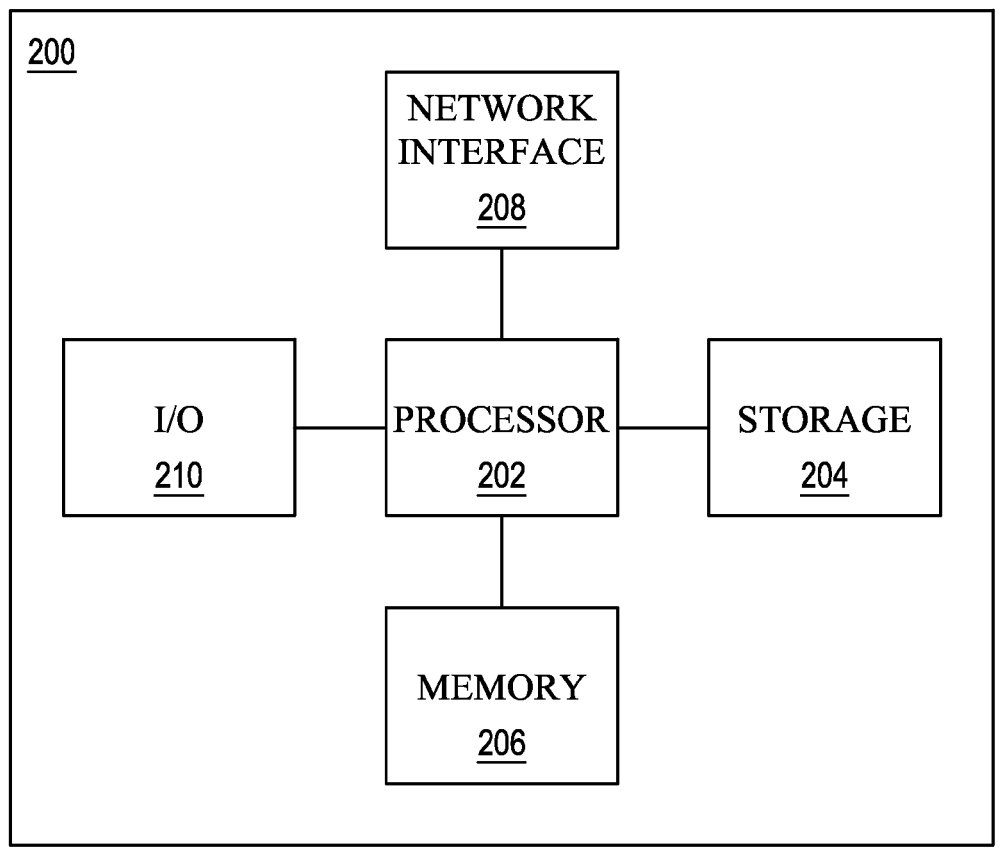
FIG. 2 is a schematic representation of a computer according to an embodiment of the present invention.

FIG. 2 is a schematic representation of a computer 200 according to an embodiment of the invention.

Computer 200 may contain a processor 202 that may control the overall operation of the computer 200 by executing computer program instructions, which may define such operation (i.e., a controller). The computer program instructions may be stored in a storage device 204 (e.g., magnetic disk, database, etc.) and loaded into memory 206 when execution of the computer program instructions is desired. Thus, applications for performing the herein-described method operations may be defined by the computer program instructions stored in the memory 206 and/or storage 204 and controlled by the processor 202 executing the computer program instructions. The computer 200 may also include one or more network interfaces 208 for communicating with other devices via a network. The computer 200 may also include input/output devices 210 (e.g., display, keyboard, mouse, speakers, buttons, etc.) that may enable user interaction with the computer 200. Computer 200 and/or processor 202 may include one or more central processing units, read only memory (ROM) devices and/or random access memory (RAM) devices. One skilled in the art will recognize that an implementation of an actual controller could contain other components as well, and that the controller of FIG. 2 is a high level representation of some of the components of such a controller for illustrative purposes.

According to an embodiment of the present invention, instructions of a program (e.g., controller software) may be read into memory 206, such as from a ROM device to a RAM device or from a LAN adapter to a RAM device. Execution of sequences of the instructions in the program may cause the computer 200 to perform one or more of the method operations described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 206 may store the software for the computer 200, which may be adapted to execute the software program and thereby operate in accordance with the present invention and particularly in accordance with the methods described in detail herein. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

Figure 3:
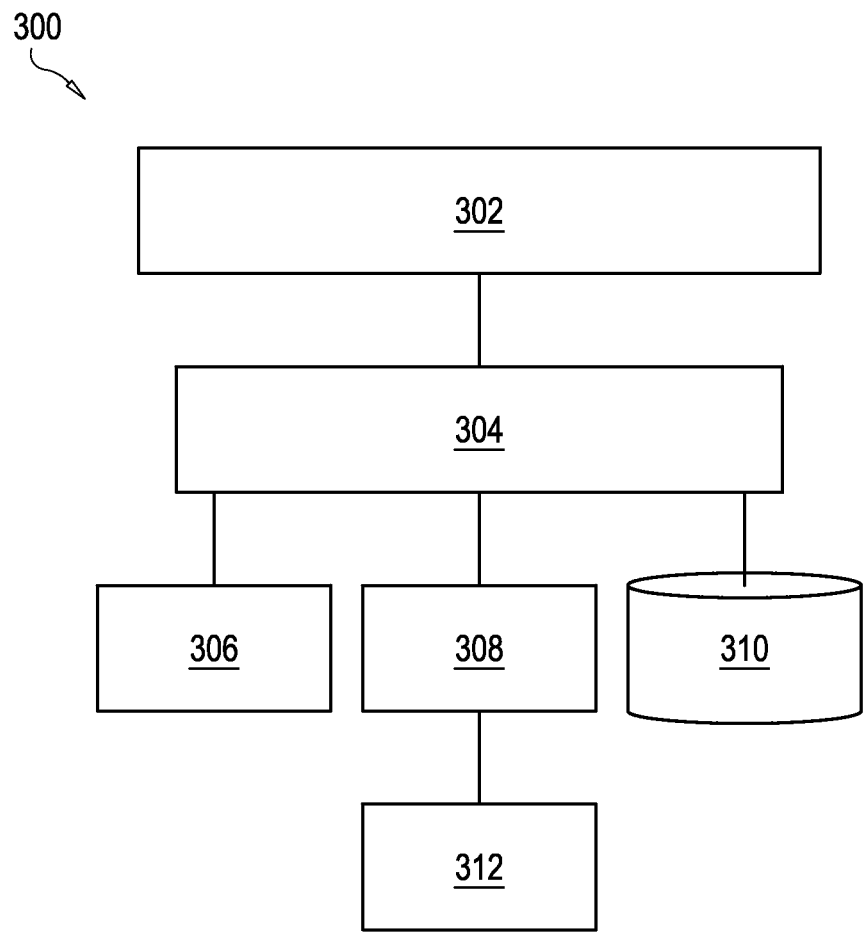
FIG. 3 is a schematic representation of a hardware object model (HOM) system according to an embodiment of the present invention.

FIG. 3 is a schematic representation of a HOM system 300 according to an embodiment of the present invention. HOM system 300 may be a group of firmware component code that model CEC 102 and provide a framework for CEC 102 initialization, diagnostics, management, and operation.

HOM 300 system may include an application interface 302, a system object 304, one or more functional unit objects 306, one or more packaging unit objects 308, a rules database 310, and a chip scan interface 312. System object 304 may be in communication with application interface 302. In turn, the one or more functional unit objects 306, the one or more packaging unit objects 308, and the rules database 310 may be in communication with the system object 304. Chip scan interface 312 may be in communication with the one or more packaging unit objects 308.

Functional unit objects 306 may represent a logical view of CEC 102. That is, the portions of the hardware on which initialization and diagnostic operations may be performed. Packaging units 308 may represent the physical containment hierarchy in CEC 102. Rules database 310 may specify the characteristics of the hardware object model via a set of rules about how the hardware may be packaged and interconnected. Chip scan interface 312 may represent the interface to device drivers of CEC 102.

In order to improve performance by having diagnostics, memory initializations, and other hardware operations running concurrently on server system 100, HOM 300 may support multi-threading across system nodes and down to the chip level. HOM 300 may include a serialization and resource contention strategy to assure that multiple independent threads of control that wish to simultaneously access the same resource do not conflict with each other and corrupt the common resource.

Generally, within the HOM 300, there may be two kinds of resource contention that need to be solved to make the system thread-safe. The first resource contention may be that low level data that is shared across multiple threads. For example, rules data may be accessed by multiple threads. The second type of resource contention may be for the CEC 102 hardware. For most operations, concurrently changing the state of the CEC 102 hardware may produce unexpected results. For hardware locking, two types of locks may be addressed—hardware communication locks and hardware operation locks. Hardware communication locks may protect the resource used to physically talk to the hardware. Hardware operation locks may protect the internal states of hardware.

Figure 4:
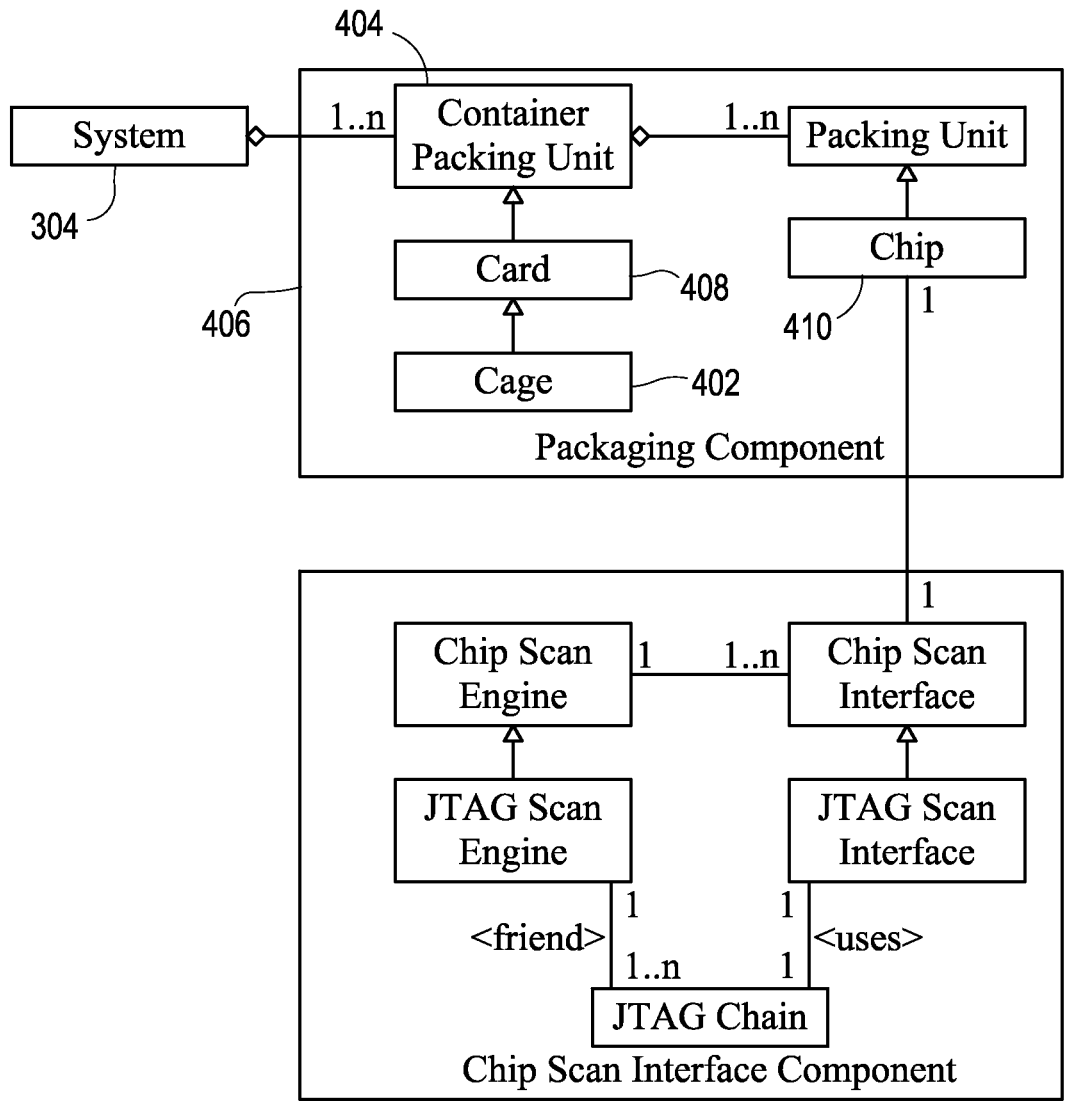
FIG. 4 is a schematic representation of a central electronic complex (CEC) according to an embodiment of the present invention.

FIG. 4 is a schematic representation of a central electronic complex (CEC) 400 according to an embodiment of the present invention. CEC 400 may be substantially similar to CEC 102, discussed above with respect to FIG. 1. In at least one embodiment, CEC 400 may be used as CEC 102.

The anchor point of the CEC 400 may be the system object (e.g., system object 304 of FIG. 3), which may be a "singleton" (i.e., a software construct that may guarantee only a single instance of the type of object will ever exist). CEC 400 may contain cage objects 402 and encapsulate system-level configuration tasks. CEC 400 may use a rules database (e.g., rules database 310 of FIG. 3) to instantiate required cage objects 402. Each container packing unit 404 may be responsible for instantiating and initializing its contained packaging units 406, which may include cards 408 and cage objects 402. Packaging unit 406 may represent a hardware field-replaceable unit (FRU).

Figure 5:
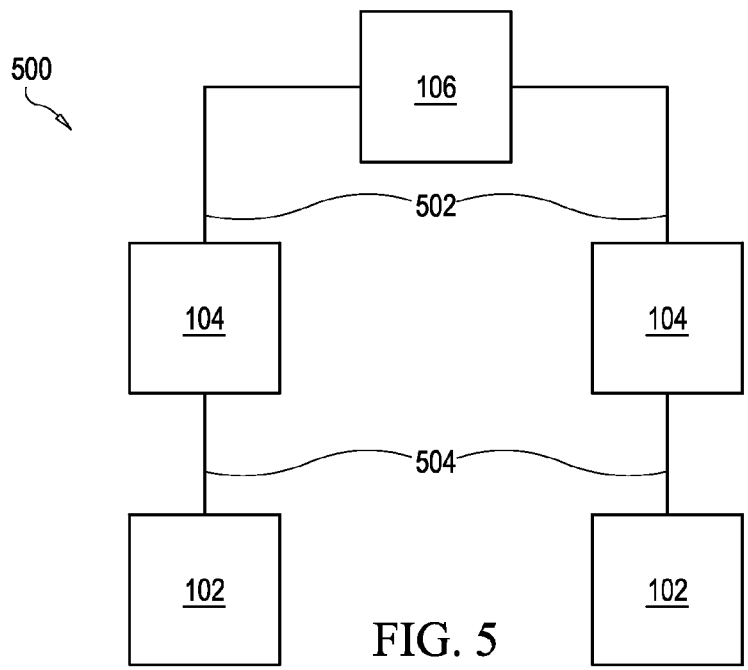
FIG. 5 is a schematic representation of a portion of a server system according to an embodiment of the present invention.

FIG. 5 is a schematic representation of a portion 500 of server system 100 according to an embodiment of the present invention. Server system processor 106 may be in communication with a plurality of flexible service processors 104 via processor support interface 502. In turn FSPs 104 may be in communication with central electronic complexes 102 via field replaceable unit (FRU) support interface 504.

As discussed above, FSPs 104 may each have a processor and persistent memory storage, not shown, but discussed above generally with respect to FIG. 2. The FSP 104 may initialize the CEC 102 and initiates the boot of the main system processor 106 to operation.

Figure 6:
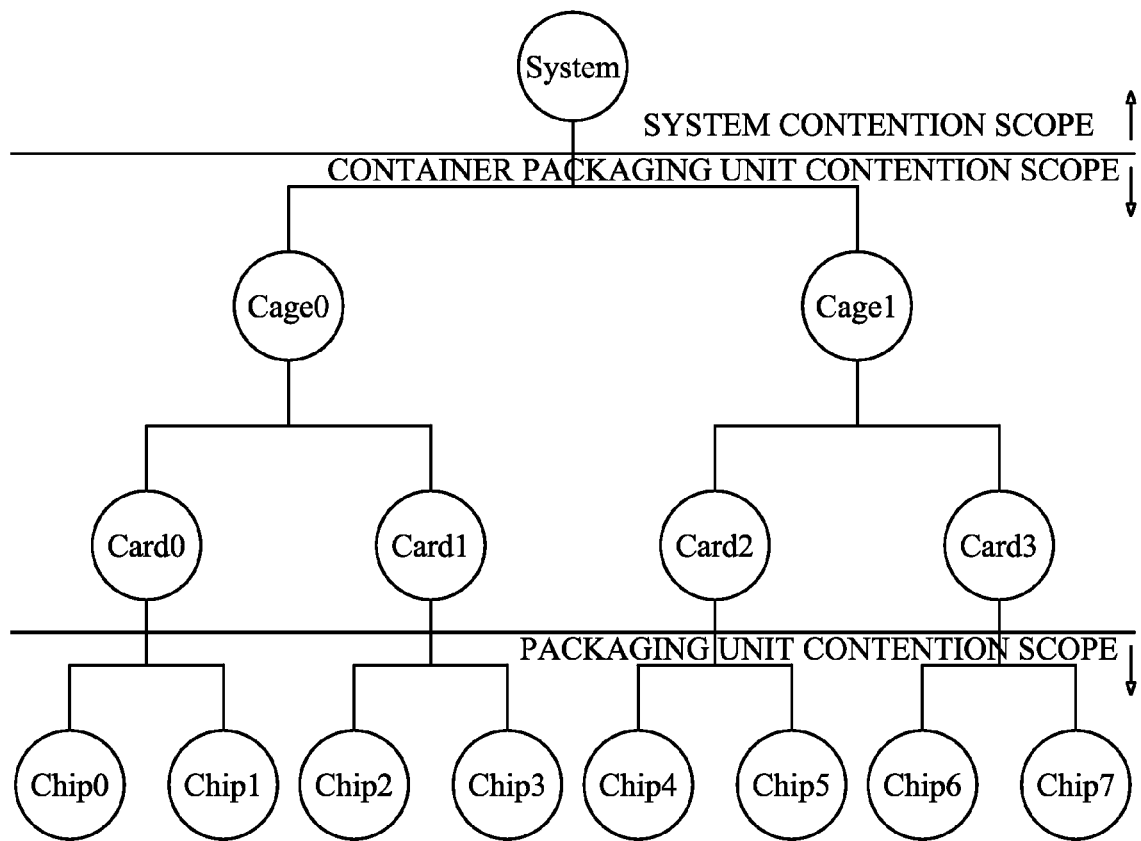
FIG. 6 is a schematic representation of a hardware operation lock according to an embodiment of the present invention.

FIG. 6 is a schematic representation of a hardware operation lock according to an embodiment of the present invention. Hardware operation locks may protect the state of hardware (e.g., CEC 102, etc.). Hardware operation locks control the right to modify the state of packaging units (e.g., packaging units 406 of FIG. 4, above) and their associated hardware across multiple method calls. They may prevent concurrent operations from switching hardware state at the same time.

Figure 7:
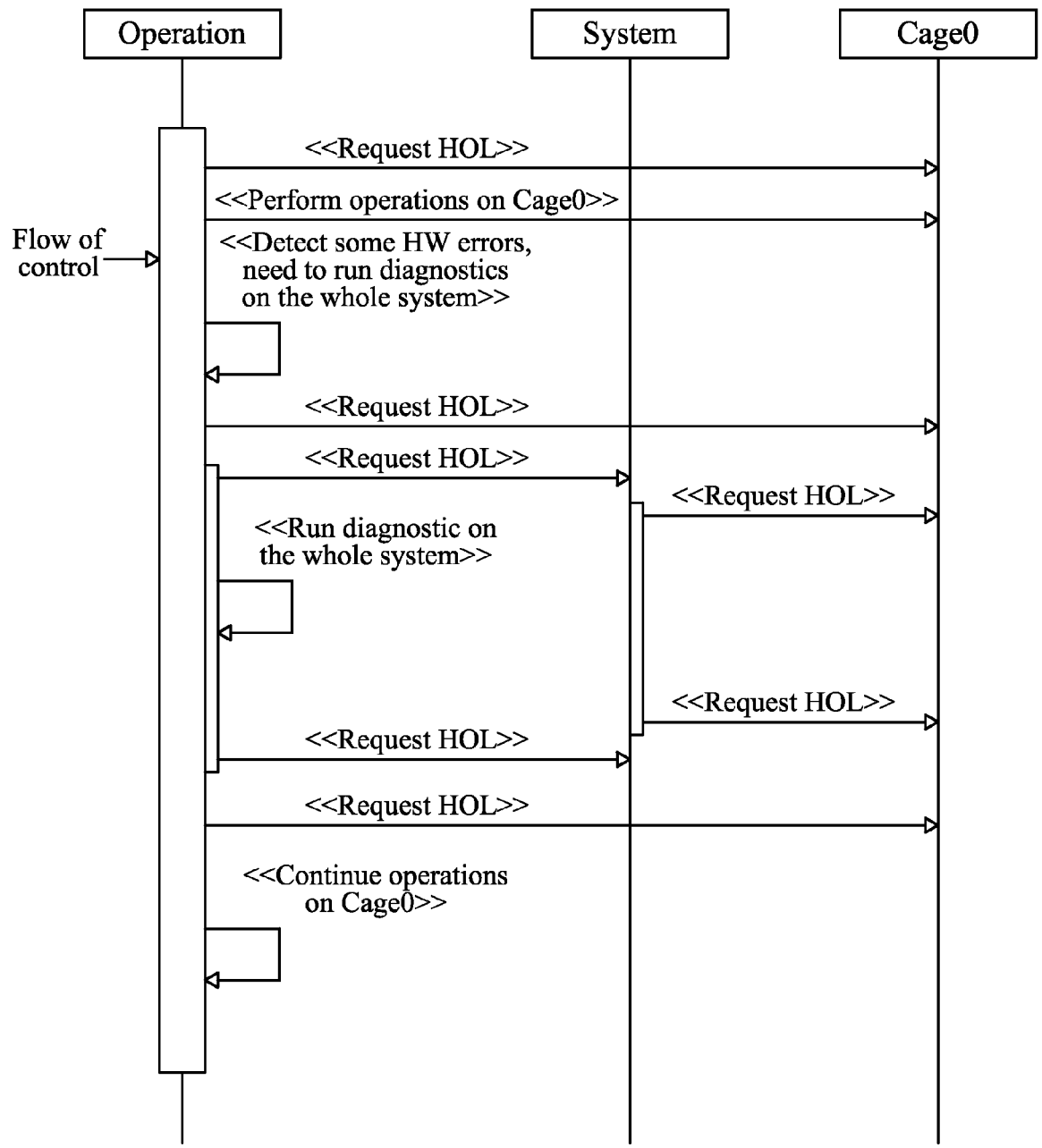
FIG. 7 is a chart of the control flow for setting higher level hardware operation locks on system and container packaging units according to an embodiment of the present invention.

FIG. 7 is a chart 700 of the control flow for setting higher level hardware operation locks on system and container packaging units according to an embodiment of the present invention. A thread holding a hardware operation lock on an object may not request a hardware operation lock on another object unless it already holds a hardware operation lock on the nearest common containing object. If a lock is held on an object lower in the containment tree and an object above it in the same tree is needed, then the lower-level object must be freed before requesting the lock on the higher-level object.

In operation, a hardware operation lock (HOL) may be requested at a cage (e.g., cage 402, etc.) and the cage may be locked by the requester. Subsequently, operations may be performed on the cage. If hardware errors are detected (e.g., errors at CEC 102, etc.), a diagnostic check may be performed on server system 100.

Based on the results of the diagnostic check, the HOL on the cage may be released. A global (e.g., system-wide) HOL may then be requested. The server system 100 may then request a HOL on the cage 402 while another diagnostic check may be performed. If the result of the diagnostic check is favorable, the server system 100 may release the HOL on cage 402 and the HOL on server system 100 may also be released. The control flow may then continue by re-requesting a HOL on cage 402 and continuing performance of operations on cage 402.

Figure 8:
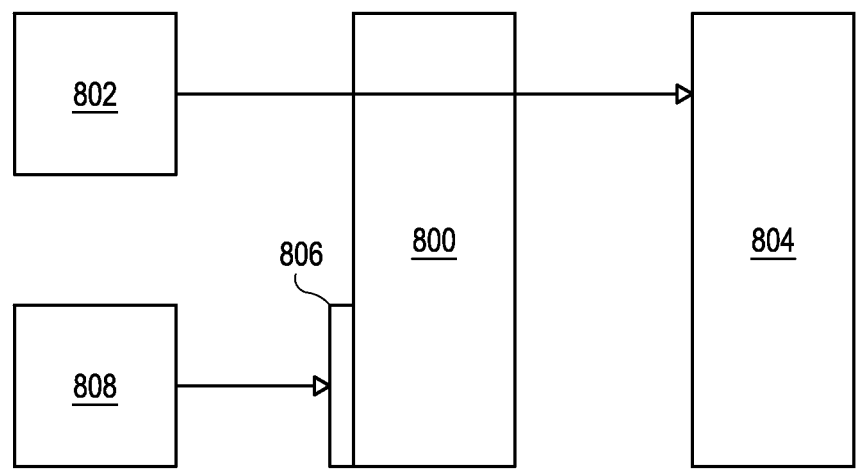
FIG. 8 is a schematic representation of an exemplary hardware communication lock (HCL) according to an embodiment of the present invention.

FIG. 8 is a schematic representation of an exemplary hardware communication lock (HCL) 800 according to an embodiment of the present invention. When invoked, HCL 800 may allow a first thread 802 to access a hardware device (e.g., chip, etc.) 804. HCL 800 may then employ a block 806 to prevent a second thread 808 from accessing hardware device 804. One of skill in the art would recognize that FIG. 8 is merely a schematic representation of the hardware communication lock protocol and any appropriate means of implementation may be used to allow thread access and/or deny thread access.

Hardware communication locks 800 may be utilized when an operation requires access to hardware devices 804 through a shared communication path. HCLs 800 may be used to lock resources that physically talk to the hardware. The state of the communication path may be orthogonal to the state of the hardware itself. When a thread is performing a specific chip scan operation, a sequence of device driver must be executed in a correct order. Accordingly, no other thread may be allowed to access this device. This may be achieved by having the HCL reserve the device path for a number of consecutive device driver calls to keep the correct sequence. When the sequence is complete, the HCL is released and other threads may access the device.

Figure 9:
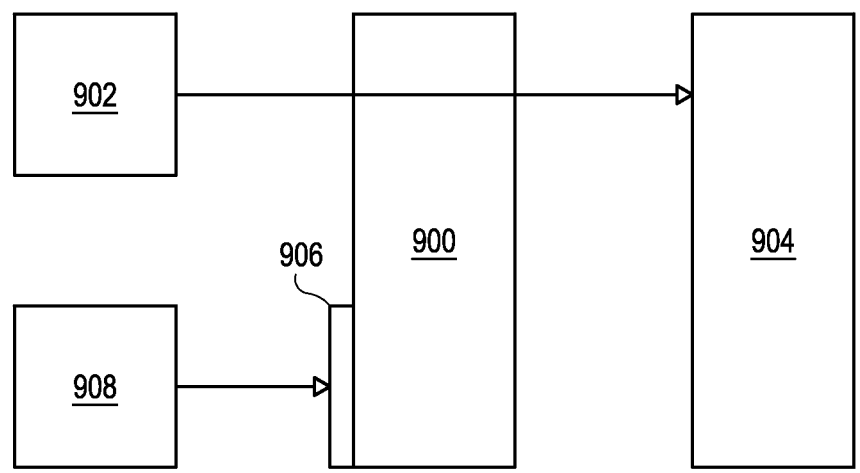
FIG. 9 is a schematic representation of an exemplary data lock according to an embodiment of the present invention.

FIG. 9 is a schematic representation of an exemplary data lock 900 according to an embodiment of the present invention. When invoked, data lock 900 may allow a first thread 902 to access a shared memory 904. Data lock 900 may then employs a block 906 to prevent a second thread 908 from accessing shared memory 904. One of skill in the art would recognize that FIG. 9 is merely a schematic representation of the data lock protocol and any appropriate means of implementation may be used to allow thread access and/or deny thread access.

Data lock 900 may be used to protect common data that may be accessed by multiple threads 902, 908. Shared memory 904 may need to be protected by data locking 900 to prevent instance data corruption that might occur due to multiple threads 902, 908 accessing the same data at the same time. When a data lock request from one of the threads 902, 908 is received and the data lock 900 is available, the data lock request may be granted and the lock owner thread 902 or 908 may have exclusive access to the shared memory 904 protected by the data lock 900.

FIG. 10 is a table 1000 for use in deadlock prevention according to an embodiment of the present invention. Column 1002 shows the lock employed by the currently running thread. The currently running thread may utilize a hardware operation lock, as described above with respect to FIGS. 6 and 7, a hardware communication lock, as described above with respect to FIG. 8, and/or a data lock, as described above with respect to FIG. 9. Row 1004 shows the available locks that a currently running thread may wish to employ in addition to the locks initially employed—shown in column 1002. The currently running thread may wish to utilize a HOL, a HCL, and/or a data lock, as described above with respect to FIG. 6-9.

As shown in row 1006, a thread holding a hardware operation lock on an object may not request a hardware operation lock on another object unless it already holds a hardware operation lock on the nearest common containing object. If the currently running thread holds a lock on an object lower in the containment tree and then determines a need for an object above it in the same tree, the thread must free the lower-level object before requesting the lock on the higher-level object.

As shown in row 1008, a thread holding a hardware communication lock may not request a hardware operation lock or a hardware communication lock. Hardware communication locks are low-level locks which must be held for a short period, and the holder may not request a hardware operation lock while holding a hardware communication lock.

As shown in row 1010, a thread holding a data lock may not request any type of lock, including another data lock. Data locks are low level-level locks which must be held for a very short period (e.g., scoped to a single function), and the holder may not request a high-level lock (e.g., a hardware operation lock and/or a hardware communication lock) while holding a data lock.

Figure 11:
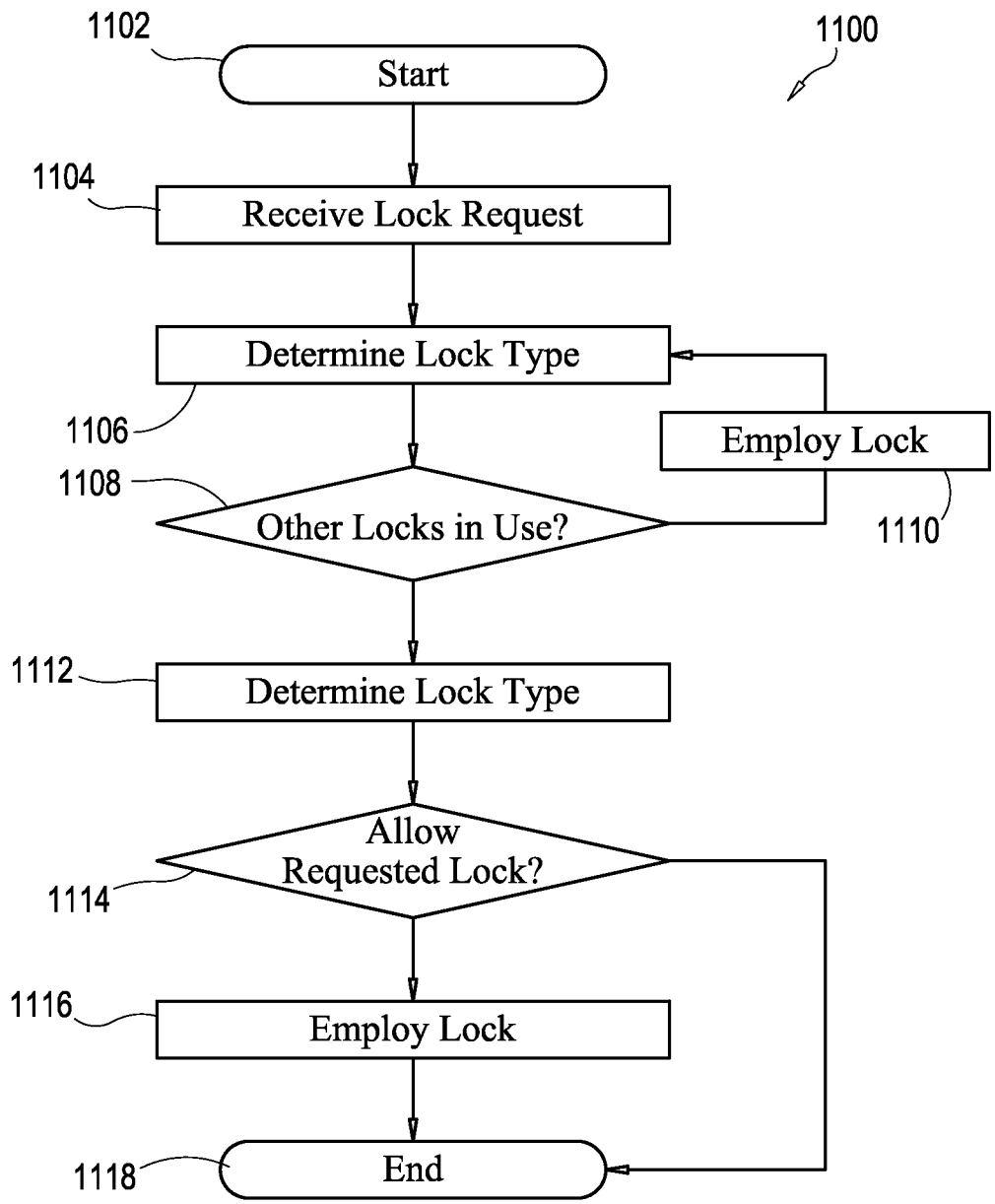
FIG. 11 is a flowchart of a method of deadlock prevention according to an embodiment of the present invention.

FIG. 11 is a flowchart of a method 1100 of deadlock prevention according to an embodiment of the present invention. The method may start at operation 1102.

In operation 1104, a request for a lock may be received. The request may be received at server system processor 106, computer 200, and/or any other appropriate location.

In operation 1106, the type of lock requested may be determined. The lock may be a hardware operation lock, as described above with respect to FIGS. 6, 7, and 10, a hardware communication lock, as described above with respect to FIGS. 8 and 10, or a data lock, as described above with respect to FIGS. 9 and 10.

In operation 1108, a check may be performed to determine if the requester of the lock has any other locks in use. If the lock requester has no other locks in use, the method may proceed to operation 1110 and the lock may be employed. Methods for employing these locks are described above with respect to FIGS. 6-9. Subsequently, the method may return control to operation 1104 to receive a new request for a lock.

If the lock requester is currently using other locks, the method 1100 may proceed to operation 1112 and the type of lock currently in use may be determined. In operation 1114, a determination may be made as to whether to allow the requested lock. If the lock is allowed, the method 1100 may proceed to operation 1116 and the lock may be employed. The method then may proceed to operation 1118 and the method may end. If the lock is not allowed, the method may proceed to operation 1118 and the method may end.

In an embodiment, the determination may be made based on table 1000 described above with respect to FIG. 10. That is, if a HOL is already in use and another HOL is requested, the request may be denied and the method may proceed to operation 1118. If a HOL is already in use and either a HCL or data lock are requested, the request may be granted and the method may proceed to operation 1116. Similarly, if a HCL is already in use and either another HCL or a HOL is requested, the request may be denied and the method may proceed to operation 1118. If a HCL is already in use and a data lock is requested, the request may be granted and the method may proceed to operation 1116. If a data lock is already in use, any request may be denied and the method may proceed to operation 1118.

FIGS. 12A-D are tables showing various deadlock scenarios that may be avoided according to an embodiment of the present invention. FIG. 12A illustrates how requesting a HOL from a data lock may result in deadlock. In this scenario, threads 1 and 2 may be requesting the same data lock and the same HOL lock. This would be a violation of the logic specified herein. FIG. 12B illustrates how requesting a HOL from a HCL may result in a deadlock. In this scenario, threads 1 and 2 may each be requesting HCL on the same device and also the same HOL lock. This would be a violation of the logic specified herein. FIG. 12C illustrates how requesting a HOL on a sibling chip may result in deadlock. In this scenario, chip A and B may be siblings on the same cage and card. Thread 2 may be requesting HOL on different sibling chips A and B without having the containing packaging units (cage, card) locked. This would be a violation of the logic specified herein. FIG. 12D illustrates how requesting a data lock on another class/object may result in deadlock. In this scenario, thread 1 and 2 may be calling classA::functionA1( ) and classB::functionB2( ). ClassA::functionA1( ) and classB::functionB2( ) may call each other resulting in a data lock deadlock. This would be a violation of the logic specified herein.

Accordingly, while the present invention has been disclosed in connection with exemplary embodiments thereof, it should be understood that other embodiments may fall within the spirit and scope of the invention as defined by the following claims.

The invention claimed is:

1. A method of deadlock prevention comprising:
receiving a first lock request;
determining if a prior lock is in use; and
determining if the first lock request can be granted based at least in part on the determination if a prior lock is in use and on a set of rules that dictate relationships between locks of different types including a hardware operation lock;
wherein the first lock request is a request for a hardware operation lock and the prior lock is a hardware communication lock, the method further comprising:
denying the first lock request.

2. The method of claim 1 further comprising:
granting the first lock request based on the determination of if the first lock request can be granted; and
employing a lock based on the first lock request.

3. The method of claim 1 further comprising:
denying the first lock request based on the determination of if the first lock request can be granted.

4. The method of claim 1 wherein the first lock request is a request for a hardware operation lock and the prior lock is a hardware operation lock, the method further comprising:
denying the first lock request.

5. The method of claim 1 wherein the first lock request is a request for a hardware communication lock and the prior lock is a hardware operation lock, the method further comprising:
granting the first lock request; and
employing the hardware communication lock based on the first lock request.

6. The method of claim 1 wherein the first lock request is a request for a data lock and the prior lock is a hardware operation lock, the method further comprising:
granting the first lock request; and
employing the data lock based on the first lock request.

7. The method of claim 1 wherein the prior lock is a data lock, the method further comprising:
denying the first lock request.

8. A non-transitory computer storage medium comprising computer program instructions capable of being executed in a processor and defining the operations of:
receiving a first lock request;
determining if a prior lock is in use; and
determining if the first lock request can be granted based at least in part on the determination if a prior lock is in use and on a set of rules that dictate relationships between locks of different types including a hardware operation lock;
wherein the first lock request is a request for a hardware operation lock and the prior lock is a hardware communication lock, the storage medium further comprising computer program instructions defining the operation of:

denying the first lock request.

9. The medium of claim 8 further comprising computer program instructions defining the operations of:
    granting the first lock request based on the determination of if the first lock request can be granted; and
    employing a lock based on the first lock request.

10. The medium of claim 8 further comprising computer program instructions defining the operation of:
    denying the first lock request based on the determination of if the first lock request can be granted.

11. The medium of claim 8 wherein the first lock request is a request for a hardware operation lock and the prior lock is a hardware operation lock, the medium further comprising computer program instructions defining the operation of:
    denying the first lock request.

12. The medium of claim 8 wherein the first lock request is a request for a hardware communication lock and the prior lock is a hardware operation lock, the medium further comprising computer program instructions defining the operations of:
    granting the first lock request; and
    employing the hardware communication lock based on the first lock request.

13. The medium of claim 8 wherein the first lock request is a request for a data lock and the prior lock is a hardware operation lock, the medium further comprising computer program instructions defining the operations of:
    granting the first lock request; and
    employing the data lock based on the first lock request.

14. The medium of claim 8 wherein the prior lock is a data lock, the medium further comprising computer program instructions defining the operation of:
    denying the first lock request.

\* \* \* \* \*